(12) United States Patent
Bourke

(10) Patent No.: US 12,217,618 B2
(45) Date of Patent: Feb. 4, 2025

(54) NOTE PLAYING GUIDE TEMPLATE FOR A MUSICAL KEYBOARD

(71) Applicant: Joseph Bourke, Brunswick (AU)

(72) Inventor: Joseph Bourke, Brunswick (AU)

( * ) Notice: Subject to any disclaimer, the term of this patent is extended or adjusted under 35 U.S.C. 154(b) by 123 days.

(21) Appl. No.: 18/041,674

(22) PCT Filed: Aug. 25, 2021

(86) PCT No.: PCT/AU2021/050964
§ 371 (c)(1),
(2) Date: Feb. 14, 2023

(87) PCT Pub. No.: WO2022/056578
PCT Pub. Date: Mar. 24, 2022

(65) Prior Publication Data
US 2023/0306868 A1 Sep. 28, 2023

(30) Foreign Application Priority Data
Sep. 16, 2020 (AU) .................. 2020903312

(51) Int. Cl.
G09B 15/02 (2006.01)
(52) U.S. Cl.
CPC .................. *G09B 15/02* (2013.01)
(58) Field of Classification Search
CPC ................................... G09B 15/02
See application file for complete search history.

(56) References Cited

U.S. PATENT DOCUMENTS

| 1,114,139 | A | * | 10/1914 | Hoffmann | A63F 3/00 283/44 |
| 1,217,810 | A | * | 2/1917 | Noel | A63B 49/08 D19/64 |
| 1,270,657 | A | * | 6/1918 | Peters | G09B 15/08 84/479 A |
| 1,293,997 | A | * | 2/1919 | Von Bornstedt et al. | G09B 15/08 84/479 R |
| 2,188,098 | A | * | 1/1940 | Bostelmann, Jr. | G09B 15/00 84/485 R |
| 3,022,698 | A | | 2/1962 | Lucas | |

(Continued)

FOREIGN PATENT DOCUMENTS

| AU | 2021342842 A1 * | 3/2023 | ............ G09B 15/02 |
| GB | 163921 A | 6/1921 | |

(Continued)

OTHER PUBLICATIONS

International Search Report & Written Opinion dated Nov. 29, 2021 from PCT Application No. PCT/AU2021/050964.
(Continued)

*Primary Examiner* — Robert W Horn
(74) *Attorney, Agent, or Firm* — INNOVATION CAPITAL LAW GROUP, LLP; Vic Lin

(57) ABSTRACT

A note playing guide template for a musical keyboard having raised and lower keys has a spine holding a plurality of interstitial guide pieces extending from one side of the spine which have guide annotations. The template is planar so that, in use, the template can be laid flat across the lower keys so that the spine is coplanar with the guide pieces, the guide pieces fit between the raised key and the spine fit s behind the raised keys.

21 Claims, 3 Drawing Sheets

(56) References Cited

U.S. PATENT DOCUMENTS

| | | | |
|---|---|---|---|
| 3,335,630 A | | 8/1967 | Schmoyer |
| 3,339,447 A | * | 9/1967 | Curry ..................... G10G 1/00 84/478 |
| D242,877 S | | 12/1976 | Bologna |
| 4,254,686 A | * | 3/1981 | Leonard ................. G09B 15/08 84/479 A |
| 4,905,567 A | * | 3/1990 | Kavoklis ................. G09B 15/02 84/479 R |
| D313,238 S | | 12/1990 | Saraceni |
| 5,089,690 A | | 2/1992 | Okamura |
| 5,107,743 A | * | 4/1992 | Decker ................... G09B 15/08 84/478 |
| D353,369 S | | 12/1994 | Leibengood |
| 5,496,179 A | | 3/1996 | Hoffman |
| 6,111,180 A | * | 8/2000 | DiGiulio ............... G09B 15/026 84/471 R |
| 6,588,756 B1 | * | 7/2003 | Hughes ..................... A63F 1/04 273/299 |
| 6,881,887 B2 | | 4/2005 | Berens |
| 7,790,973 B1 | * | 9/2010 | Winther ............... G09B 15/026 84/478 |
| 7,897,861 B2 | | 3/2011 | DeLong et al. |
| 8,686,268 B1 | * | 4/2014 | Young ................... G09B 15/02 84/470 R |
| D760,837 S | * | 7/2016 | Schnell ........................... D17/9 |
| D841,090 S | | 2/2019 | Cloyd |
| D881,265 S | | 4/2020 | Rhone |
| D888,151 S | | 6/2020 | McGinnis |
| D972,630 S | * | 12/2022 | Bourke ........................... D17/9 |
| D1,022,040 S | * | 4/2024 | Guan ............................... D17/9 |
| D1,029,086 S | * | 5/2024 | Li ................................... D17/9 |
| 2023/0306868 A1 | * | 9/2023 | Bourke ................. G09B 15/02 |

FOREIGN PATENT DOCUMENTS

| | | | |
|---|---|---|---|
| JP | 2008304879 A | | 12/2008 |
| JP | 3210842 U | * | 6/2017 |
| JP | 7399250 B1 | * | 12/2023 |
| WO | WO-8700952 A1 | * | 2/1987 |

OTHER PUBLICATIONS

International-type search report dated Aug. 4, 2021 from Australia Application No. 2020903312.

Piano Key Stickers. Date first available: Feb. 23, 2022. Site visited Jul. 6, 2022. Available from Amazon: https://www.amazon.com/Stickers-Beginners-Full-Size-Keyboard-Overlay/dp/B09T6WR648/ref=asc_df_B09T6WR648/?tag=hyprod-20&linkCode=df0%E2%80%A6 (Year: 2022).

The Piano Rake. Date first available: 2022. Site visited Jul. 6, 2022. Available online: https://thepianorake.com/en-us (Year: 2022).

* cited by examiner

NOTE PLAYING GUIDE TEMPLATE FOR A MUSICAL KEYBOARD

FIELD OF THE INVENTION

This invention relates generally to note playing guide template for a musical keyboard.

BACKGROUND OF THE INVENTION

Modern piano keyboards comprise 52 white keys and 36 black keys, totalling 88 keys and covering seven octaves plus a minor third (from A0 to C8). The black keys are raised and set further back as compared to the white keys and each key represents a specific musical note. The white keys signify the seven note names (A-G) whereas the black keys identify sharp or flat notes.

Musical keyboard playing guides which use templates that are placed over piano keys have been devised for aiding beginners by indicating the key positions.

Most musical keyboard guides comprise a panel which stands vertically against the keyboard fall board to indicate relative key positioning thereunderneath, including U.S. Pat. No. 4,905,567 A (KAVOKLIS et al.) 6 Mar. 1990 which discloses a musical instrument teaching aid which comprises sections which snap together and stand vertically against the fall board to represent notes.

U.S. Pat. No. 5,107,743 A (DECKER) 28 Apr. 1992 similarly discloses a panel which stands vertically across the keyboard but which has lights located directly above the piano keys to be played.

U.S. Pat. No. 7,897,861 B2 (Delong et al.) 2010 Aug. 26 similarly has pre-printed rectangular sheets which are inserted upright behind the keyboard and which have instructional fingering guides marked as arrows to assist students learning and practice playing scale sequences both forwards and backwards.

U.S. Pat. No. 6,881,887 B2 (Berens) 2005 Jan. 27 similarly discloses a guide with vertical numerically colour-coded lines which can be moved along behind the keyboard.

Other configurations have been devised, including the arrangement taught by JP 2008304879 A (HAMAYOSHI ERIKO) 18 Dec. 2008 which has a rear vertical fixing section which stands vertically against the keyboard backboard and from which a plurality of pitch name indicating sections extend orthogonally across the white keys.

JP 3210842 U (TAEKO OSAKI) 8 Jun. 2017 discloses another version having a booklet having rectangular cutouts along a binding thereof so that various pages thereof may be opened across the white keys.

GB 163921 A (SIEGEL) 2 Jun. 1921 furthermore discloses a note indicator to be laid on a piano keyboard which comprises a plate which rests on the rear parts of the white keys and has forwardly-projecting depressible tongues bearing different pictures of common objects and/or notes. The black keys project through slots in the plate which is extended vertically to a part folded rear parts of the black keys which similarly bear pictures of objects or notes.

The present invention seeks to provide a guide template for a musical keyboard, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein a note playing guide template for a musical keyboard comprising raised keys (typically coloured black) and lower keys (typically white).

The template has a spine holding a plurality of interstitial guide pieces extending from one side of the spine which have guide annotations.

The template is planar so that, in use, the template can be laid flat across the lower keys so that the spine is coplanar with the guide pieces, the guide pieces fit between the raised key and the spine fits behind the raised keys.

The present configuration was surprisingly found to be able to fit most commercially available keyboards discreetly and without easily becoming dislodged unlike the aforedescribed prior art arrangements which stand above the lower keys.

The spine may have a width of less than 10 mm, preferably approximately 5 mm. As such, the present spine was found to be able to either fit between the fall board and rear edges of the raised keys of most commercial keyboards or extend slightly under the fall board for more compact commercial keyboards.

The template is preferably flexible and may be made of rubber such as silicon, a material which allows the template to lie flat across the lower keys with a relatively higher coefficient of static friction as compared to cardboard or the like to prevent movement of the template and wherein each piece has sufficient weight and flexibility to move with the fall of each lower key. A template made of silicon may be approximately 1.5 mm thick.

The pieces may be annotated with clef, staff and/or note annotations. The annotations may be arranged to provide clear guidance without visual clutter wherein, for example, the staff notation may be provided only on a subset of the pieces, the notes may arranged more apparently above the staff notation and/or the notes may be relatively large, such as comprising a width of more than half the width of each respective piece.

The length of each piece may be sufficient to display the visual annotations but not to extend too far along each lower key to interfere with finger placement. In this regard, each piece may comprise a length so as to not extend beyond half the length of each raised key, such as wherein each piece comprises a length less than 40 mm, such as approximately 30 mm.

The template may define consecutive group gaps of 2 and 3 to conform with the corresponding spacing of the raised keys. Adjacent pieces between each group may be separated with a slit so as to yet allow each piece to move independently with each respective lower key.

The sizing and spacing of the pieces may be configured to prevent interference with adjacent pieces or adjacent raised keys, including accounting for manufacturing tolerances where the template is made of silicon. For example, the slits between adjacent pieces may be between 1-2 mm in width, preferably approximately 1.7 mm. Furthermore, the gaps between the guide pieces may generally be between 13 and 15 mm in width. Furthermore, the width of each piece may generally be between 12.5 mm and 13.5 mm.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
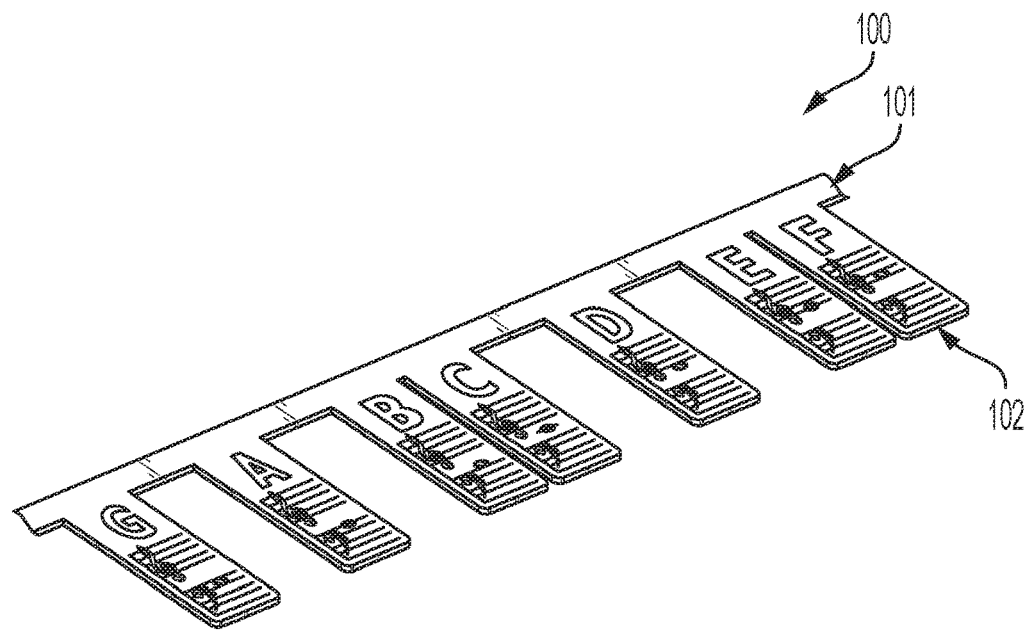
FIG. 1 shows a perspective view of a portion of note playing guide template for a musical keyboard in accordance with an embodiment.

A note playing guide template 100 is designed for placement flat across a musical keyboard 108 having raised keys 103 and lower keys 104. The raised keys 103 are generally coloured black whereas the lower keys 104 are generally white.

The template 100 comprises a spine 101 holding a plurality of interstitial guide pieces 102 from one side of the spine 101.

The guide pieces 102 have guide annotations printed thereon.

The template 100 is planar and the spine 101 is relatively narrow so that, in use, the template 100 can be laid flat across the lower keys 104 so that the spine 101 and the guide pieces 102 are coplanar, the guide pieces 102 fit between the raised keys 103 and the spine 101 fits behind the raised keys.

Figure 2:
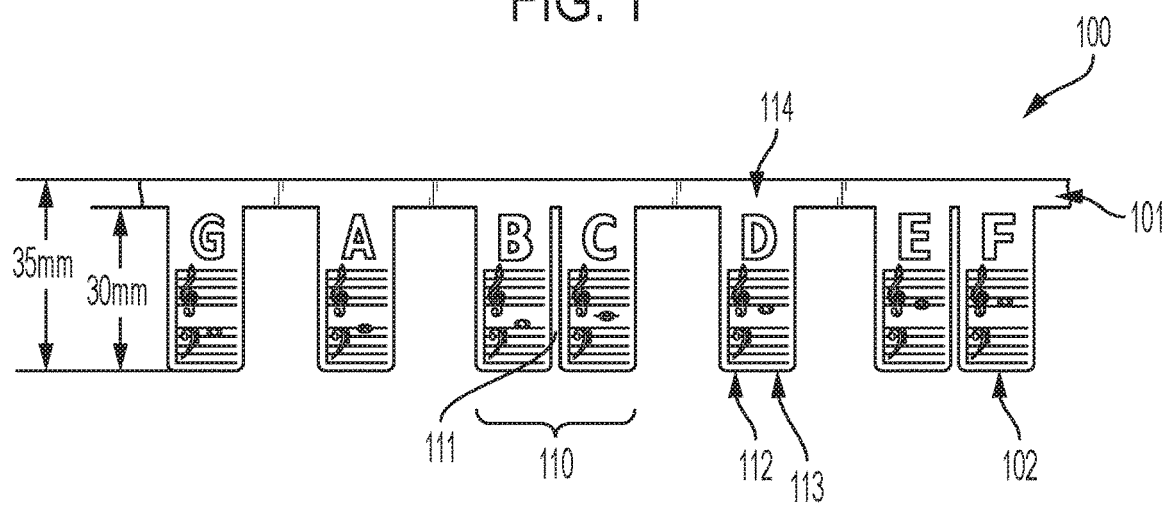
FIG. 2 shows a plan view of the portion of the template.

With reference to the exemplary dimensions given in FIG. 2, the spine 101 has a width of less than 10 mm, preferably approximately 5 mm.

Figure 3:
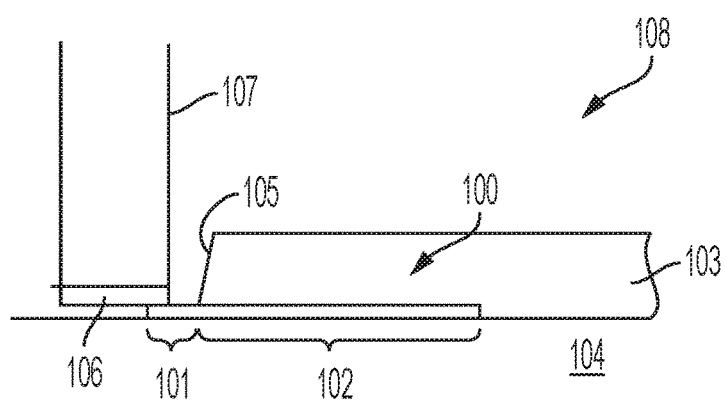
FIG. 3 shows a side elevation view of a keyboard showing how the playing template fits behind the raised keys.
Figure 4:
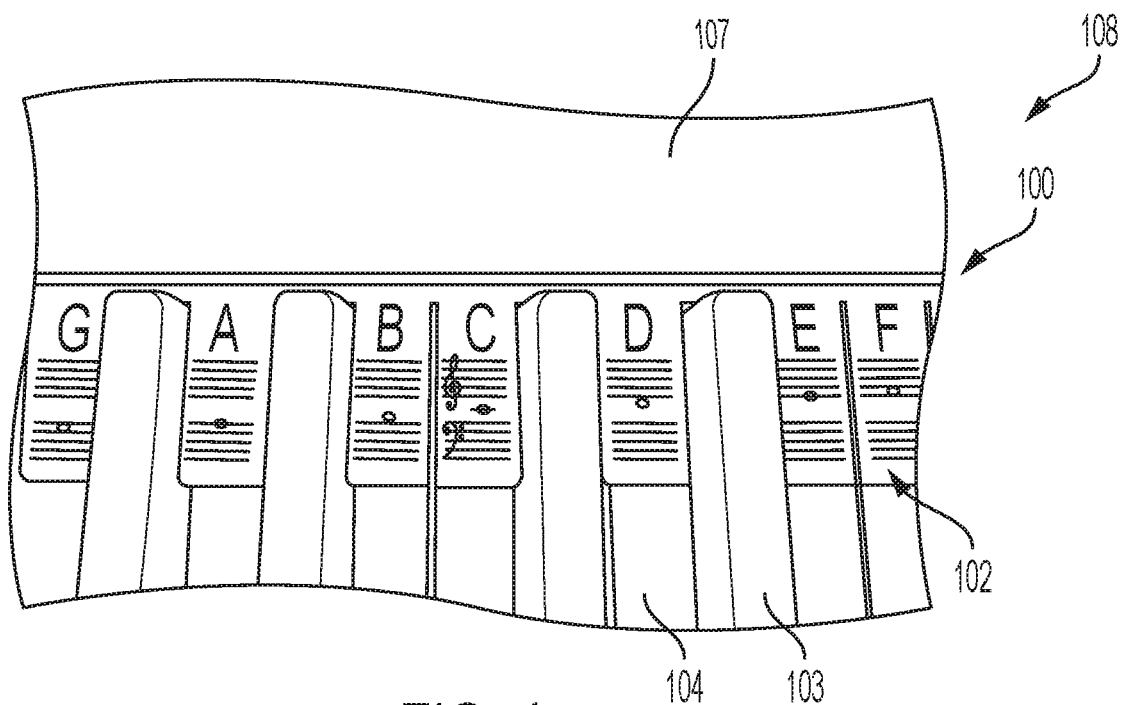
FIG. 4 shows a front perspective view of the template fitted to a keyboard.

FIG. 3 shows a cross-sectional view of the keyboard 108 showing the respective positioning of the raised keys 103 and the lower keys 104. The keyboard 108 typically comprises a fall board 107 backing the raised keys 103 and, in embodiments, the lower keys 104 may extend under the lower edge of the fall board 107.

The relatively narrow width of the spine 101 was found to be able to fit behind rear edges 105 of raised keys 103 of most conventional keyboards 108.

In embodiments, the relatively narrow spine 101 is able to fit entirely between adjacent the fall board 107 rear edges 105 of the raised keys 103.

However, for certain keyboards, the spine 101 may extend slightly under the fall board 107. As shown in FIG. 3, some keyboards 108 comprise felt padding 106 interfacing a lower edge of the fall board 107 and upper surfaces of the lower keys 104. As shown in FIG. 3, the spine 101 may extend slightly under the fall board 107 and felt pad 106.

Figure 5:
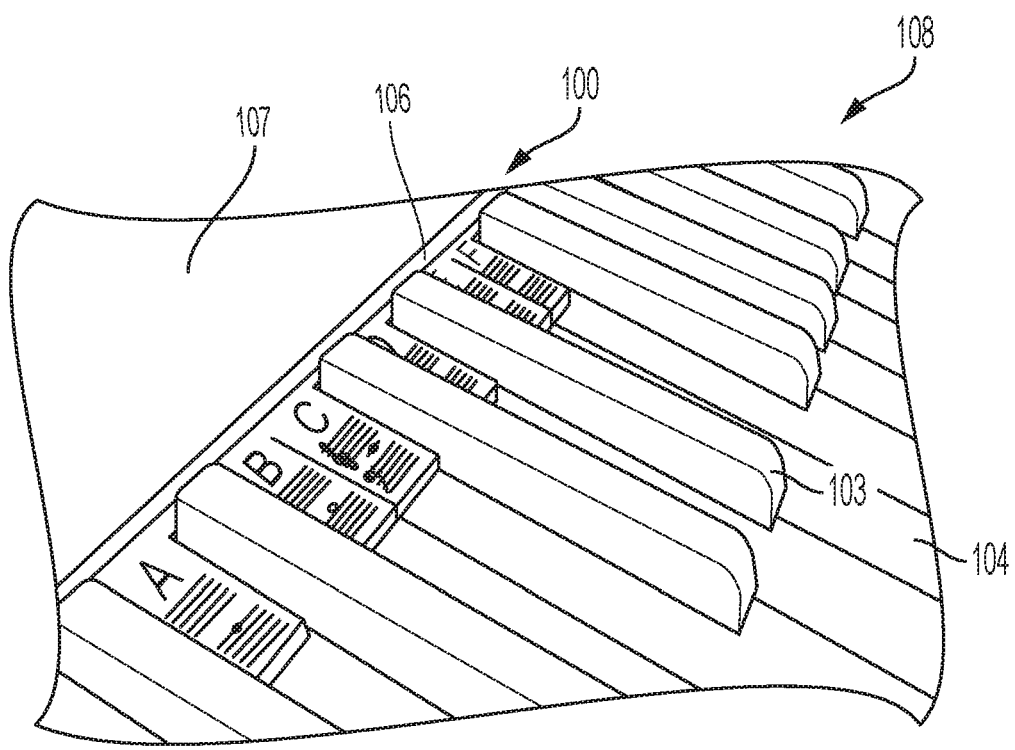
FIG. 5 shows a side perspective view of the template fitted to a keyboard.

The guide pieces 102 may have sufficient length to be able to adequately show the annotations but without interfering with finger placement on the lower keys 104. With reference to FIG. 5, the pieces 102 may extend less than half the length of the raised keys 103. With reference to the exemplary dimensions shown in FIG. 2, the template 100 may comprise an overall width of approximately 35 mm whereas each guide piece 102 may comprise a length of approximately 30 mm as shown.

Figure 6:
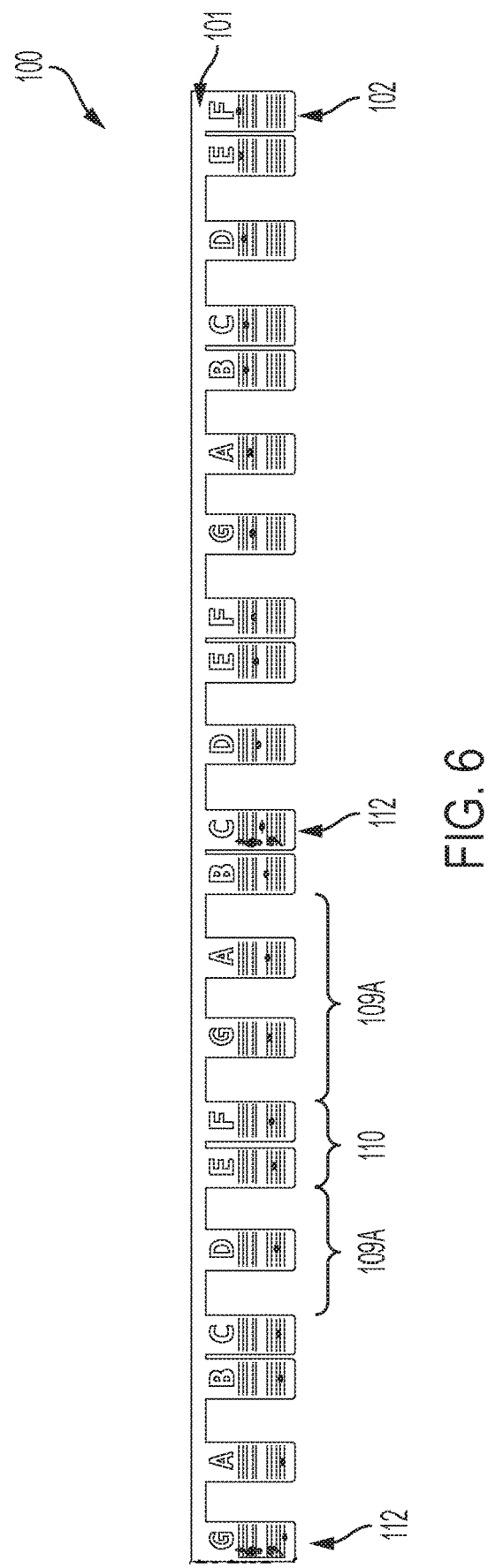
FIG. 6 shows a plan view of the note playing guide comprising exemplary dimensions in accordance with an embodiment.

In the embodiment shown in FIG. 6, the template 100 comprises 21 pieces 102 and comprises a width of approximately 480 mm. Alternative forms of the template 100 comprising a differing number of guide pieces 102 are envisaged, including a template 100 comprising 61 guide pieces 102.

With further reference to FIG. 6, the pieces 102 form consecutive gap groups 109 comprising a two-gap group 109A and three-gap group 109B to accommodate the correspondingly grouped raised keys 103 therebetween.

The pieces 102 may comprise adjacent pieces 110 between adjacent groups 109. With reference to FIG. 2, pieces 102 of adjacent pieces 110 may be separated by a slit 111 therebetween so that each piece 102 may move independently with the respective lower key 104. The slit 111 may be between 1-2 mm wide, preferably approximately 1.7 mm wide, and with which was found to provide adequate separation for independent movement of each adjacent piece 102 including accommodating manufacturing tolerances where the template 100 is made from silicon.

The annotations may comprise clef notation 112, staff notation 113 and/or alpha character notes 114.

As shown in FIG. 6, the clef notation 112 may be provided only on a subset of the pieces 102 so as to not visually clutter the annotations. In embodiments shown in FIG. 6, the clef notation 112 is provided only on the leftmost piece 102 or a middle piece 102, which may correspond with the middle C key.

As shown in FIG. 2, the notes 114 may be positioned above the staff notation 113 for visual prominence when playing. The notes 114 may be relatively large, such as by occupying approximately half the width of each piece or more.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. A note playing guide template for a musical keyboard having raised and lower keys, the template comprising a spine holding a plurality of interstitial guide pieces extending from one side of the spine, guide pieces having guide annotations thereon, wherein the template is planar so that, in use, the template can be laid flat across the lower keys so that the spine is coplanar with the guide pieces, the guide pieces fit between the raised key and the spine fits behind the raised keys, wherein guide pieces form consecutive two-gap and three-gap groups along the template, and wherein there are two adjacent guide pieces between the gaps, which are separated from each other.

2. The template as claimed in claim 1, wherein the spine has a width of less than 10 mm.

3. The template as claimed in claim 1, wherein the spine has a width of approximately 5 mm.

4. The template as claimed in claim 1, wherein the pieces do not extend more than half the length of the raised keys.

5. The template as claimed in claim 1, wherein the pieces each extend a length of less than 40 mm from the spine.

6. The template as claimed in claim 1, wherein the pieces extend approximately 30 mm from the spine.

7. The template as claimed in claim 1, wherein the template is flexible.

8. The template as claimed in claim 7, wherein the template comprises rubber.

9. The template as claimed in claim 7, wherein the template comprises silicon.

10. The template as claimed in claim 9, wherein the template is approximately 1.5 mm thick.

11. The template as claimed in claim 1, wherein each guide piece corresponds with the respective lower key.

12. The template as claimed in claim 1, wherein the adjacent guide pieces are separated by between 1 and 2 mm.

13. The template as claimed in claim 1, wherein the guide annotations comprise at least one of staff notation, alpha character notes and clef notation.

14. The template as claimed in claim 13, wherein the clef notation is only on a subset of the guide pieces.

15. The template as claimed in claim 13, wherein, on each guide piece, each note is arranged above the staff notation.

16. The template as claimed in claim 13, wherein, each note takes more than half the width of each respective piece.

17. The template as claimed in claim 1, wherein gaps between the guide pieces are between 13 and 15 mm in width.

18. The template as claimed in claim 1, wherein a width of each piece is between 12.5 mm and 13.5 mm.

19. A method of fitting the template as claimed in claim 1 to a musical keyboard having raised and lower keys, the method comprising laying the template flat across the lower keys so that the so that the spine is coplanar with the guide pieces, the guide pieces fit between the raised keys and the spine fits behind the raised keys.

20. The method as claimed in claim 19, wherein the spine fits entirely between rear edges of the raised keys and a fall board of the keyboard.

21. The method as claimed in claim 19, wherein the spine extends slightly under the fall board.

* * * * *